United States Patent [19]
Frantz

[11] 3,876,400
[45] Apr. 8, 1975

[54] MULTI-STAGE AIR FILTER ASSEMBLY
[75] Inventor: Virgil L. Frantz, Salem, Va.
[73] Assignee: Graham-White Sales Corporation, Salem, Va.
[22] Filed: Nov. 1, 1973
[21] Appl. No.: 412,015

[52] U.S. Cl. .................... 55/267; 55/313; 55/314; 55/316; 55/323; 55/337; 55/394; 55/399; 55/423; 55/457; 55/485; 55/486; 55/489; 55/495; 55/522
[51] Int. Cl. ........................................... B01d 53/00
[58] Field of Search ............. 55/267, 218, 312–314, 55/323, 316, 337, 423, 424, 426, 392, 394, 395, 397, 399, 522, 526, 457, 485, 495

[56] References Cited
UNITED STATES PATENTS

| | | | |
|---|---|---|---|
| 1,739,093 | 12/1929 | Ruby................................. | 55/322 X |
| 2,106,589 | 1/1938 | Bigger et al...................... | 55/399 X |
| 2,170,074 | 8/1939 | Hewitt .............................. | 55/313 X |
| 2,385,745 | 9/1945 | Vogt.................................. | 55/424 X |
| 2,507,125 | 5/1950 | Townsend...................... | 55/313 UX |
| 2,804,937 | 9/1957 | Poole................................ | 55/522 X |
| 2,840,183 | 6/1958 | George ............................. | 55/267 |
| 3,144,315 | 8/1964 | Hunn ................................ | 55/522 X |
| 3,246,455 | 4/1966 | Boddy............................... | 55/319 |
| 3,343,345 | 9/1967 | Carolan ........................... | 55/526 X |
| 3,402,529 | 9/1968 | Frantz............................... | 55/267 |
| 3,442,067 | 5/1969 | Swenson ......................... | 55/337 X |
| 3,452,519 | 7/1969 | Bianchetta...................... | 55/323 |
| 3,653,191 | 4/1972 | Nelson et al.................... | 55/337 X |
| 3,722,187 | 3/1973 | Potter et al...................... | 55/323 |
| 3,751,884 | 8/1973 | Hathorn........................... | 55/267 |

OTHER PUBLICATIONS
"The King Compressed Air Filters and Dryers", King Eng. Corp., Ann Arbor, Mich., 10–72, pp. 2,3 and Supplement 1, 4–66.

Primary Examiner—Frank W. Lutter
Assistant Examiner—Kathleen J. Prunner
Attorney, Agent, or Firm—Wilmer Mechlin

[57] ABSTRACT

An air filter assembly for filtering contaminants from forced air in four stages, the first and second centrifugal and gravity separations enhanced by liquid condensation from cooling of the air and performed respectively in removably connected upper and lower parts of the assembly's housing, and the third and fourth straight filtering by coarse and fine filter media units contained respectively in the lower and upper parts. The lower part is internally baffled for breaking up the whirling of the air from the upper part and both parts are externally finned for rapid dissipation of the heat concentrated on the periphery of the housing by the whirling of the air in the upper part. Separated contaminants, collected in a sump in the lower part, are removed periodically through a central tube by a drain valve surmounting the housing and the scrubber and coarse and fine filter units are removably mounted on the tube for cleaning or replacement on access to the interior by removal of the lower part. A check valve in a bypass passage enables the assembly to operate as a three-stage filter if the scrubber becomes plugged.

8 Claims, 3 Drawing Figures

MULTI-STAGE AIR FILTER ASSEMBLY

BACKGROUND OF THE INVENTION

As recognized in Frantz U.S. Pat. No. 3,402,529, the filtration of contaminants from forced air by a porous filter medium is alone inadequate for numerous installations and far more effective when combined with a preliminary centrifugal separation in which the air being processed is cooled below its entering temperature. The present invention is particularly concerned with improving upon the assembly of that patent.

SUMMARY OF THE INVENTION

The primary object of the present invention is to provide an improved multi-stage air filter assembly combining centrifugal, gravity and condensation separations with filtration through porous filter media for filtering contaminants from forced air.

Another object of the invention is to provide an improved multi-stage air filter assembly for filtering contaminants from forced air wherein the filtering is performed in a plural part housing having removably connected upper and lower parts, the upper part contains a downwardly directed helical air passage for centrifugal separation, the lower part is internally baffled for gravity separation, air from the lower part is passed to an outlet through a plurality of filter units contained in the housing, and the upper and lower parts are externally finned for increased cooling efficiency and further separation of liquid contaminants by condensation.

An additional object of the invention is to provide an improved multi-stage air filter assembly wherein the assembly of the preceding object is surmounted by a drain valve connected through a central tube to a sump in the bottom of the lower part of the housing for periodically draining collected liquid and solid contaminants therefrom, and has as its porous filter units a scrubber and paper or like filter element removably mounted on the central tube for ready removal on detachment of the lower part.

A further object of the invention is to provide an improved multi-stage air filter assembly included in the assembly of the preceding object a check valve in a passage by-passing the scrubber, whereby the assembly will continue to operate in case the scrubber becomes plugged.

Other objects and advantages of the invention will appear hereinafter in the detailed description, be particularly pointed out in the claims and will be illustrated in the accompanying drawings, in which:

FIGURE DESCRIPTION

DETAILED DESCRIPTION

Figure 1:
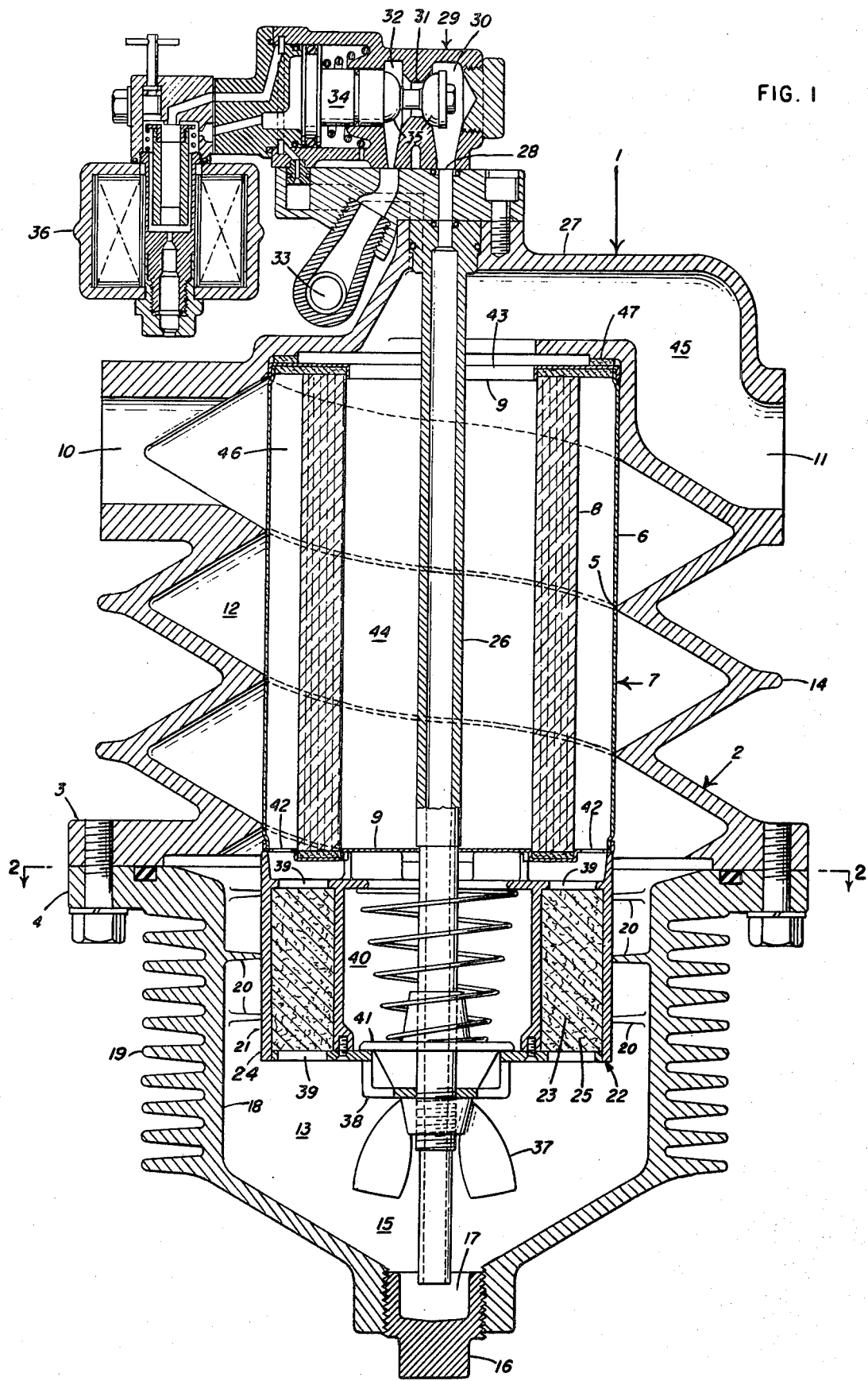
FIG. 1 is a central vertical sectional view of a preferred embodiment of the improved multi-stage air filter assembly of the present invention.
Figure 2:
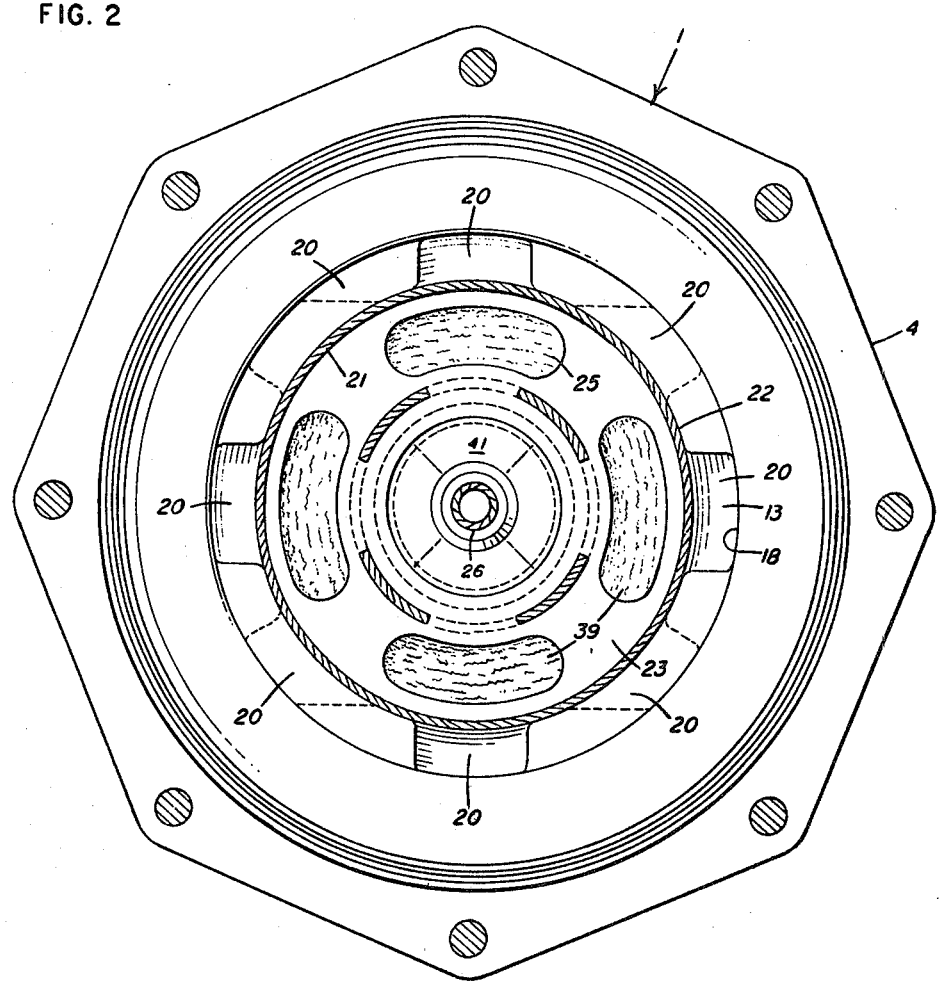
FIG. 2 is a horizontal sectional view taken along lines 2—2 of FIG. 1.
Figure 3:
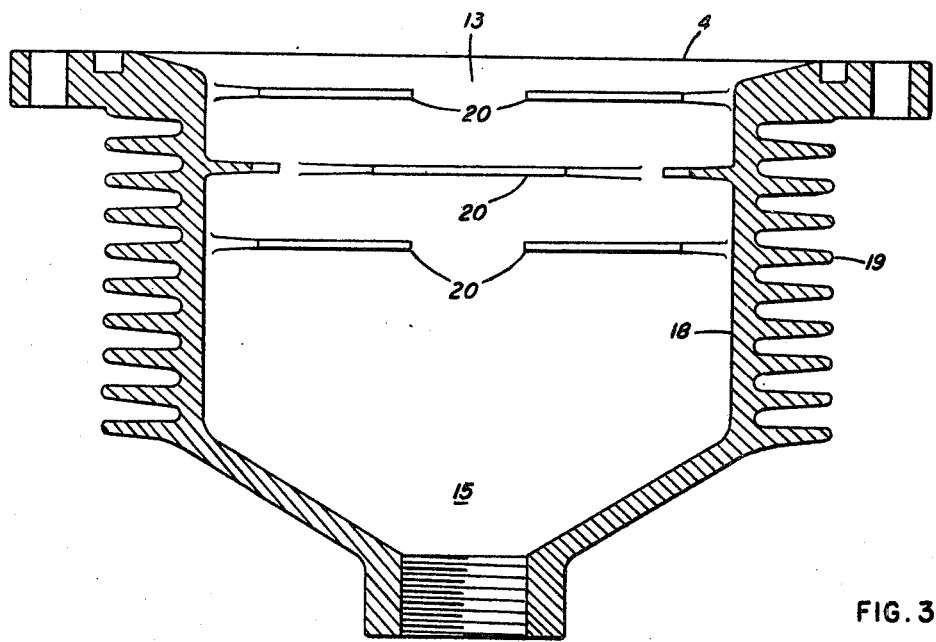
FIG. 3 is a view on the section of FIG. 1 of the lower part of the housing removed from the assembly.

Referring now in detail to the drawings in which like reference characters designate like parts, the improved multi-stage air filter assembly of the present invention, while adapted generally for filtering contaminants from forced air, is particularly designed for use in diesel locomotive compressed air systems and will be so described as exemplary of the invention.

In the designed use in diesel locomotive compressed air systems, the improved assembly, designated as 1, usually will be most effective when mounted downstream of the locomotive's No. 2 compressed air reservoir (not shown) in which the air is maintained under pressure, ordinarily in the range of 100–140 p.s.i.

The assembly 1 is comprised of a housing or body 2 formed of an upper part 3 and a lower part 4 bolted or otherwise releasably connected or attached to the upper part. In its upper housing part 3 the present assembly is substantially the same as the housing 3 of the embodiment of FIG. 1 of the air filter assembly of Frantz U.S. Pat. No. 3,402,529. Thus, the upper part 3 has a vertical, preferably cylindrical bore 5 for slidably receiving or seating a correspondingly shaped sleeve or shell 6 of a fine-filtering porous filter unit 7, suitably of the conventional can type with a paper or like cylindrical filter element or medium 8 spaced inwardly from the sleeve and contained between end caps 9 fixed thereto. The upper housing part 3 has inlet and outlet ports 10 and 11, respectively, on opposite sides adjacent its upper end and the inlet port opens into a spiral or helical passage 12 surrounding the bore 5 and leading downwardly to the interior 13 of the lower part 4. With the preferred helical air passage 12 triangular in cross-section, the upper part is helically convoluted for most of its height in conformance with the passage's configuration, and is externally finned over the length of the passage, suitably by a continuous helical fin 14 following the perimeter of the passage.

Save for the means later to be described for periodically or cyclically draining solid and liquid contaminants and that the preferred lower part 4 is a bowl or cup bolted to the upper part 3, the present assembly differs markedly from the assembly of the above Frantz patent. The lower part or bowl 4 does have a downwardly tapering funnel-shaped body portion forming a sump 15 and at the bottom a clean-out plug 16 coaxial or concentric with the central bore 5 and an upwardly opening central cavity 17 in the plug. However, above the sump 15 the side wall 18 of the bowl 4 not only is substantially vertical but is externally finned over substantially its full height, suitably by radially projecting rows of vertically spaced fins 19. In addition, the vertical side wall 18 over its upper part is internally finned by a plurality of vertically spaced rows of radially instanding, circumferentially spaced fins or baffles 20. The internal fins 20 of each row are staggered relative to those of any adjoining row and the fins inwardly together or collectively bound or demark a preferably concentric and co-radial downward extension 21 of the central bore 5 in the upper part 3. Seated or received in the bore extension 21 is a suitably cylindrical, hollow-walled scrubber unit 22, the annular space 23 in the wall 24 of which is filled or packed with stainless steel wool 25 or like material to form a coarse porous filter medium.

For draining liquid and solid sediment collected in the sump 15, the assembly 1 has a central vertical drain tube 26 concentric or coaxial with the bore 5 and centered on and extending upwardly through the scrubber and filter units 22 and 7 and the top wall 27 of the housing and connecting thereabove to an inlet port 28 of a drain valve 29. Since the preferred drain valve 29 of the illustrated embodiment is identical with the drain valve 2 of the previously mentioned Frantz patent and is fully shown and described in that patent, only a brief description will here suffice. The inlet port 28 of the drain valve 29 opens into an inlet chamber 30 connectable through an intervening aperture 31 to an outlet chamber 32 draining to the exterior through an outlet drain port 33. A differential piston 34 having a head or valve member 35 in each of the chambers 30 and 32, and normally springheld with the outer or leading head closing the intervening or intermediate aperture 31, is shiftable by the pressure of actuating air against the spring force to momentarily open the aperture before closing it from the other side by the inner or trailing head. As in the drain valve of the Frantz patent, the actuating air conveniently is supplied by a solenoid-actuated control valve 36 controlled in its action by a suitable timer (not shown) and using as its actuating air filtered air drawn from the housing 2 in advance of the outlet port 11.

The filter and scrubber units 7 and 22 conveniently are mounted or supported in tandem on the drain tube 26 by threading the tube below the scrubber unit for receiving a wing nut 37 and providing on the tube an upwardly skirted washer 38 engaging and acting between the wing nut and the bottom of the scrubber unit. End openings 39 in the scrubber unit 22 at opposite ends of the annular space 23, permit air to pass from the interior 13 of the bowl 4 through the coarse filtering steel wool 25, while a central axial passage 40 containing a spring-pressed check valve 41 and normally closed thereby against ingress of air from the bowl, serves as a by-pass through the scrubber unit in case its steel wool becomes too clogged or plugged to pass air.

Supported itself on the drain tube 26 by the wing nut 37, the scrubber unit 22 in turn engages at its top, the bottom end cap 9 of the paper element or fine porous filter unit 7 for holding the latter in place. Passing air diagonally or laterally from outside to inside through its filter element 8, the filter unit 7 has circumferentially spaced inlet ports or openings 42 in its bottom or lower end cap 9 between the sleeve 6 and the filter element and a single outlet port 43 in its upper or top end cap 9 laterally within and of substantially the same diameter as the inside diameter of the filter element. Closed at the bottom by the bottom end cap, the filter unit 7 has thereabove between the filter element and the drain tube 26 an inner annular air passage 44 opening upwardly onto an outlet passage 45 in the housing 2 leading to the outlet port 11 and separated by the filter element 8 from an outer annular air passage 46 in the unit between the filter element and the sleeve 6. A rubber or like gasket 47 between the upper end cap 9 of the filter unit 7 and the top wall 27, outwardly of the filter element 8, effectively seals against leakage of air around the filter unit between the helical passage 12 and the outlet passage 45.

Except for components of the drain valve 29, the filter assembly 1 has no moving parts and depends for filtering dirty air on forced air flow derived from a compressor or other suitable outside source. In the operation of the assembly the forced or compressed dirty air to be filtered, on entering or being introduced through the inlet port 10, impinges upon the confronting surface of the sleeve 6 and is diverted by that surface to flow as a helical vortex or cyclone downwardly through the helical passage 12 in a fixed, transversely confined or contained, helical or spiral path. Losing part of the entrained liquid and solid contaminants by the initial impingment, the air, as it rotates or whirls around the sleeve 6, is subjected to centrifugal force by which the suspended contaminants of greater densities are centrifugally separated and deposited on the outside wall of the passage adjacent the latter's apex or periphery for downward gravity movement due to the gradient along the outer wall of the passage to the entrance of the interior 13 of the lower part 4.

The centrifugal force resulting from the vortical or cyclonic flow of the air not only effectively separates heavier liquid and solid contaminants therefrom but also concentrates or compacts the air itself toward the outside of the passage with consequent concentration of heat from both the air and the sleeve 6 along the perimeter or side wall 18 of the upper part about or bounding the passage for transfer or loss to ambient air through the helical fin 14. The effect is a progressive reduction not only in the temperature of the air relative to its entering temperature, but also in the temperatures of the sleeve and outside wall of the passage toward the bottom of the latter, with the reduction increased if the ambient air is moving rather than still. Even in the heat of summer, a temperature reduction in the air on the order of about 25°F. over the length of the helical passage is commonplace and the cooling of the air by condensing entrained liquids increases the efficiency of the separation.

If passing without interference into the interior 13 of the lower part 4, the whirling air from the upper part 3 will tend to form a boundary layer of dead air along the lower part's side wall 18, with consequent detriment to heat transfer through that wall to ambient air. This tendency is inhibited by the rows of relatively staggered interior or internal baffles 20 integral with and instanding from the side wall 18, which by their circumferential spacing permit any separated contaminants to move or flow therepast to the sump 15, and by their staggering and consequent tortuous air path effectively interrupt or break up the whirling of the air and prevent forming of an objectionable dead air boundary layer. Since the side walls of the upper and lower parts are in direct contact, the heat concentrated by the cyclonic flow of the air in the passage 12 over the side wall of the upper part is in part transferred or spread by conduction over the lower part's side wall 18, and the latter is enabled to participate or cooperate with the upper part's side wall in transferring or losing heat to ambient air. The effectiveness of the side wall 18 as a transfer agent is increased by the external fins 19 and further increased, if, as opposed to the upper part 3 which suitably is made of cast iron, the lower part 4 preferably is made or formed of a relatively high heat conductivity metal, such as aluminum. As a consequence of the cooling action of the lower part, the air as it passes through that part is further reduced in temperature with a corresponding further increase in the condensation and in this case gravity separation of entrained liquid contaminants.

Still moving rapidly under its entering impetus, the partially filtered air is reversed in direction within the interior 13 of the lower part 4 and flows upwardly through the steel wool or like coarse filter medium 25 of the scrubber unit 22 for removal of larger or coarser solid particles still suspended in the air. Passing from the scrubber unit to the inlet ports 42 of the fine filter unit 7, the air flows upwardly in the outer passage 46 of that unit and across the intervening filter element 8 to the inner passage 44 and from thence as filtered air through the outlet passage 45 to the outlet port 11. Although capable of trapping any remaining fine solid particles, the paper filter element 8 preferably used as the filter medium in the unit 7 also acts hygroscopically to absorb liquids suspended in a supersaturated condition in the air and too small and light to be removed in the preceding stages.

The liquid and solid contaminants separated in the first two stages in the upper and lower parts 3 and 4 by the combined action of centrifugal force, gravity and condensation by cooling, are collected in the sump 15 in the lower part. On the periodic opening of the intervening aperture 31 between the inlet and outlet ports 28 and 31 of the drain valve 29 when the piston 34 is actuated, the collected contaminants are forced by the pressure of the overlying air in the lower part's interior 13 upwardly through the drain tube 26 and ejected under the same pressure through the valve's outlet port 31. During such draining, escape of filtered air by the same route is prevented in part by the momentary opening of the intervening aperture 31 but mainly by the downward extension of the drain tube 26 into the cavity 17 in the clean-out plug 16, the extension enabling substantially all of the collected contaminants to be ejected while imposing the barrier of the contaminants in the cavity to ingress of air into the tube.

During the operation of the assembly, it is possible for the filter medium 25 of the scrubber unit 21 to be plugged against passage of air by entrapped solids and oil or like liquids, with consequent reduction of the air pressure in the central passage 40 relative to that in the lower part's interior 13. In such case the check valve 41 in the central passage 40 in the scrubber unit 21 enables the assembly to continue to operate as a three-stage filter with the scrubber by-passed by being openable at a predetermined pressure differential between the interior 13 and passage 40. Any such plugging will be caught in the next of the inspections of the assembly, conducted at suitable intervals, when the lower part 4 is unbolted from the upper part 3 for internal access to the housing 2 and after unscrewing the wing nut 37 the scrubber and upper filter medium units 22 and 7 are slid off the drain tube, the former for washing and the latter for periodic replacement. Since during the inspection the interiors of the upper and lower parts are exposed and readily accessible, they too can be cleaned if this proves necessary.

From the above detailed description it will be apparent that there has been provided an improved multi-stage air filter assembly which is highly efficient in filtering forced air as a result of subjecting the air to a multiplicity of successive stages of filtering of different types. It should be understood that the described and disclosed embodiment is merely exemplary of the invention and that all modifications are intended to be included that do not depart from the spirit of the invention and the scope of the appended claims.

Having described my invention, I claim:

1. A multi-stage assembly for filtering forced air, comprising a housing divided vertically into releasably connected upper and lower parts in metal-to-metal contact, a vertical bore in said upper part and having a downward extension into said lower part, a fine filter unit in said upper part and having a sleeve slidably received in said bore therein, a coarse filter unit slidably received in said bore extension in tandem with said fine filter unit, spaced inlet and outlet air ports in said upper part, a vertically directed helical air passage in said upper part bounded laterally by a side wall thereof and said sleeve and opening upwardly onto said inlet port and downwardly onto an interior of said lower part outwardly of said bore extension, said passage directing air from said inlet port to flow cyclonically downwardly therethrough for centrifugally separating contaminants from said air and discharging said air and contaminants into said lower part, baffle means in said lower part between a side wall thereof and said coarse filter unit for interrupting the cyclonic motion of said air from said passage to prevent forming of a boundary layer of dead air along said side wall of said lower part while passing said air and contaminants, a sump in said lower part below said side wall for collecting separated contaminants and directing said air upwardly for flow in succession through said coarse and fine filter units to said outlet port, said upper and lower parts being externally finned for heat transfer to ambient air, drain tube means extending upwardly from said sump through said filter units to an upper end of said housing and releasably mounting said filter units, and drain valve means surmounting said housing and connected to an upper end of said tube means for periodically draining collected contaminants from said sump.

2. A multi-stage assembly according to claim 1, wherein said baffle means are a plurality of vertically spaced rows of circumferentially spaced baffles instanding from the side wall of the lower part and bounding the bore extension therein.

3. A multi-stage assembly according to claim 2, wherein said coarse filter unit is a scrubber unit and including means for by-passing said unit in case of plugging thereof.

4. A multi-stage assembly according to claim 3, wherein the by-pass means includes a central passage through the scrubber unit and check valve means in and normally closing said passage and openable under a predetermined pressure differential between said passage and the interior of the lower part on plugging of the scrubber unit.

5. A multi-stage assembly according to claim 2, wherein said fine and coarse filter units are respectively a can filter containing a hygroscopic paper filter element and a scrubber unit containing a steel wool filter medium.

6. A multi-stage assembly according to claim 1, wherein the lower part is made of high heat conductivity metal.

7. A multi-stage assembly according to claim 6, wherein the external finnings of the upper and lower parts are respectively a helical fin following the perimeter of the helical passage and a plurality of vertically spaced rows of annular radial fins.

8. A multi-stage assembly according to claim 1, wherein said drain tube means is centered on said filter units, and including wing nut means for releasably mounting said coarse filter unit and therethrough said fine filter unit on said tube.

* * * * *